UNITED STATES PATENT OFFICE.

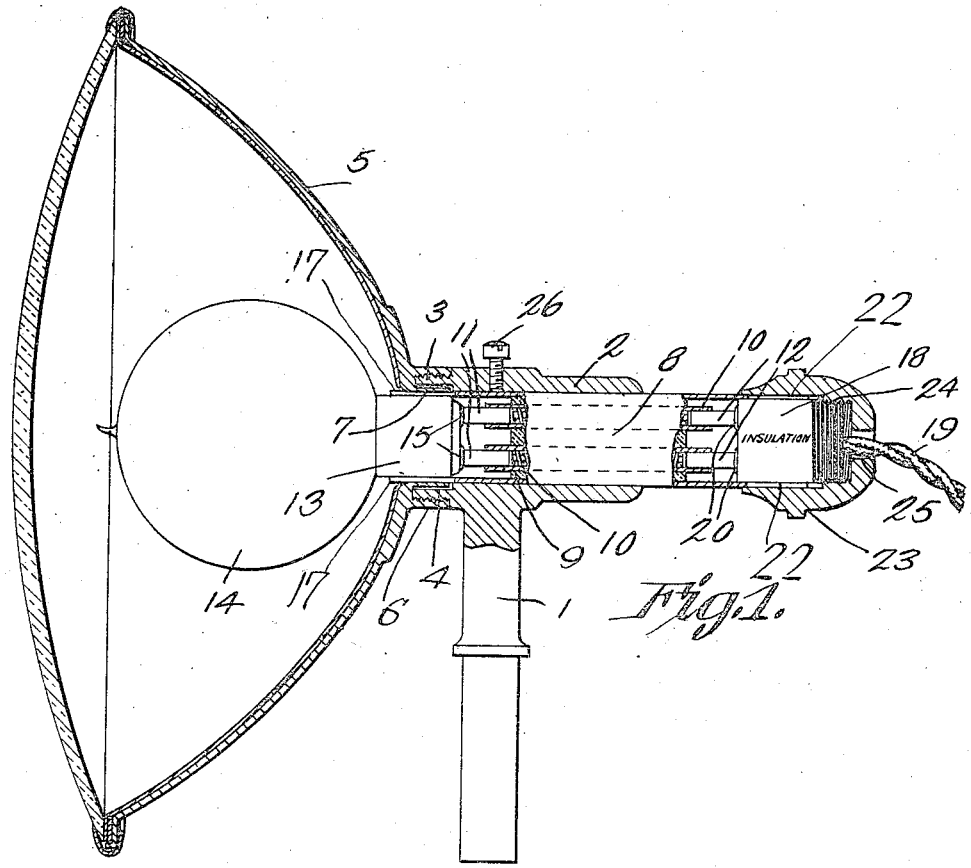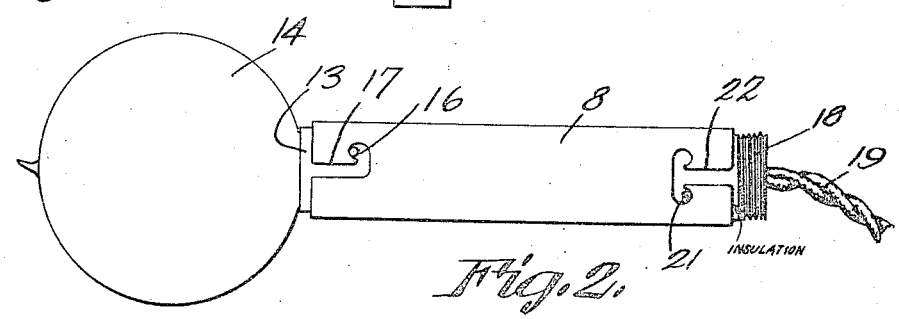

WALLER LOUIS KAUFMANN, OF SANTA ANA, CALIFORNIA.

AUTOMOBILE SPOT-LIGHT.

1,235,809.

Specification of Letters Patent.     Patented Aug. 7, 1917.

Application filed October 24, 1916. Serial No. 127,445.

*To all whom it may concern:*

Be it known that I, WALLER L. KAUFMANN, a citizen of the United States, residing at Santa Ana, in the county of Orange and State of California, have invented a new and useful Automobile Spot-Light, of which the following is a specification.

The present invention appertains to electric lamp fixtures, such as are used upon automobiles, and the object of the invention is the provision of certain novel improvements adapted especially for use in automobile spot lights.

One of the objects of the invention is the provision of means whereby the electric lamp can be readily focused or adjusted axially within the parabolic reflector.

Another object of the invention is the provision of novel means for assembling conductors with the lamp socket tube and for turning the light on and off conveniently.

It is also the object of the invention to provide a spot light having the improvements above mentioned, which, at the same time, is comparatively simple and inexpensive in construction, as well as practical, convenient and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a median section of the fixture, portions being shown in elevation.

Fig. 2 is a plan view of the lamp socket tube and corresponding parts removed.

The structure embodies a shank 1 adapted to be supported by a suitable bracket, and provided with a sleeve 2 arranged at right angles therewith and having a reduced portion 3 at one end having a counter bore 4.

A parabolic reflector 5 of sheet metal or other suitable material has a boss or hub 6 threaded upon the reduced portion 4, and the reflector is provided within the boss 6 with a collar 7 fitting snugly within the counter bore 4 flush with the bore of the sleeve 2.

A lamp socket tube 8 of greater length than the sleeve 2 is slidable snugly through said sleeve and collar 7, and has fitted therein between its ends a plug 9 of insulating material through which a pair of tubes or sleeves 10 extend. Contacts 11 and 12 are slidable within the ends of the sleeves 10 and are spring projected.

The plug 13 of the lamp 14, which is disposed within the reflector 5, is fitted within the respective end of the tube 8, and the plug 13 has a pair of contacts 15 to engage the contacts 11, when the outstanding lugs 16 of the plug 13 are moved into the bayonet slots 17 with which the tube 8 is provided at its lamp socket end.

A plug 18 of hard rubber or other insulating material is slipped into the outer end of the tube 8, and has attached thereto, the conductors of a cord 19 and the plug 18 is provided at that end opposite the conductors with a pair of contacts 20 engageable with the contacts 12 when the plug 18 is turned to one position. The plug 18 has outstanding lugs 21 to engage T-shaped bayonet slots 22 with which the tube 8 is provided at its outer end. When the plug 18 is rotated to an intermediate position it can be readily applied to or removed from the tube 8, and by turning the plug 18, in one direction, the contacts 20 are brought into engagement with the contacts 12 while when the plug 18 is rotated in the opposite direction, the contacts 20 are removed from the contacts 12 so as to open the circuit and extinguish the lamp.

A cap 23 fits slidably upon the outer end portion of the tube 8, to cover the slots 22 and lugs 21, and the cap 23 is provided at its central portion with a contracted portion 24 threaded or otherwise engaged upon the plug 18, to attach the plug and cap together, the plug 18 fitting within the tube 8 while the cap 23 fits upon and surrounds the tube. The cap 23 has a central restricted aperture 25 through which the cord 19 extends. The cap 23 is constructed of brass or other suitable metal, and provides a handle for manipulating the plug 18, and also covers the slots 22. The cap 23 also provides a handle for sliding the tube 8 in the sleeve 2, whereby the lamp 14 can be focused within the reflector 5, or adjusted axially of the reflector. The tube 8 is held in any adjusted position by means of a set screw 26 carried by the sleeve 2 to bear against the tube 8.

Having thus described the invention, what is claimed as new is:

A device of the character described, embodying a supporting bracket having a sleeve, a reflector connected detachably with one end of said sleeve, a tube slidable through said sleeve and projectable into said reflector, a lamp within the reflector having a plug fitted within the corresponding end of said tube, the tube having a slot at its other end, a plug of insulating material fitted in the last mentioned end of the tube and having a lug movable in the said slot for holding the second mentioned plug in place, means within the tube for connecting said plugs electrically, conductors connected to the second mentioned plug, and a cap fitted upon the second mentioned end of the tube and covering the slot therein, the cap having a central aperture through which said conductors extend and having a contracted portion adjacent to said apertures threadedly receiving the second mentioned plug, said cap serving as a handle for manipulating the second mentioned plug and said tube.

In testimony that I claim the foregoing as my own, I have hereto affixed my signature in the presence of two witnesses.

WALLER LOUIS KAUFMANN.

Witnesses:
 CARL H. KAUFMANN,
 KENNETH VAN SLYCK.